United States Patent

Wasson

[15] 3,674,226
[45] July 4, 1972

[54] AIRCRAFT PARKING METHOD AND MEANS

[72] Inventor: Richard Z. Wasson, Flossmoor, Ill.

[73] Assignee: Federal Sign and Signal Corporation, Chicago, Ill.

[22] Filed: April 6, 1970

[21] Appl. No.: 25,859

[52] U.S. Cl. .................................244/114 R, 340/26
[51] Int. Cl. .................................................B64f 1/22
[58] Field of Search ...............244/114, 114 R; 340/26, 25, 340/29, 22, 23, 24, 27, 28; 240/1.2, 7.7; 33/46, 46.5; 114/43.5; 40/217

[56] References Cited

UNITED STATES PATENTS

| 3,599,143 | 8/1971 | Brown et al. | 340/26 |
|---|---|---|---|
| 1,349,277 | 8/1920 | Honig | 340/26 |
| 2,497,427 | 2/1950 | Weiss | 340/26 |
| 2,602,850 | 7/1952 | Cline | 340/26 |
| 3,305,826 | 2/1967 | Kaplan | 340/26 |

OTHER PUBLICATIONS

Aviation Week & Space Technology, December 12, 1966. Page 73 relied on.

Primary Examiner—Milton Buchler
Assistant Examiner—Paul E. Sauberer
Attorney—Gary, Parker, Juettner, Pigott & Cullinan

[57] ABSTRACT

Method and means for parking aircraft in selected position for cooperation with jetway passenger ramps; the means being characterized by a first pair of neon tubes having a position of visual alignment defining a lead line and a second pair of neon tubes having a position of visual alignment defining a park line intersecting said lead line, the point of intersection of the two lines being located at the selected parking position; the method being characterized by the steps of steering the craft to a position wherein the first pair of tubes are visually aligned whereby to locate the craft on said lead line, taxiing the craft along said lead line by maintaining visual alignment of said first pair of tubes until attaining a position wherein the second pair of tubes are visually aligned, and stopping the craft in the last named position, i.e., the position wherein the pilot of the aircraft sits at the point of intersection of said lines.

To facilitate spot parking of different types, styles, or sizes of aircraft in respective selected spots, the said second pair of tubes may include therewith additional tube means for cooperation with one of the tubes of the pair for defining additional park lines intersecting the lead line at different points.

15 Claims, 6 Drawing Figures

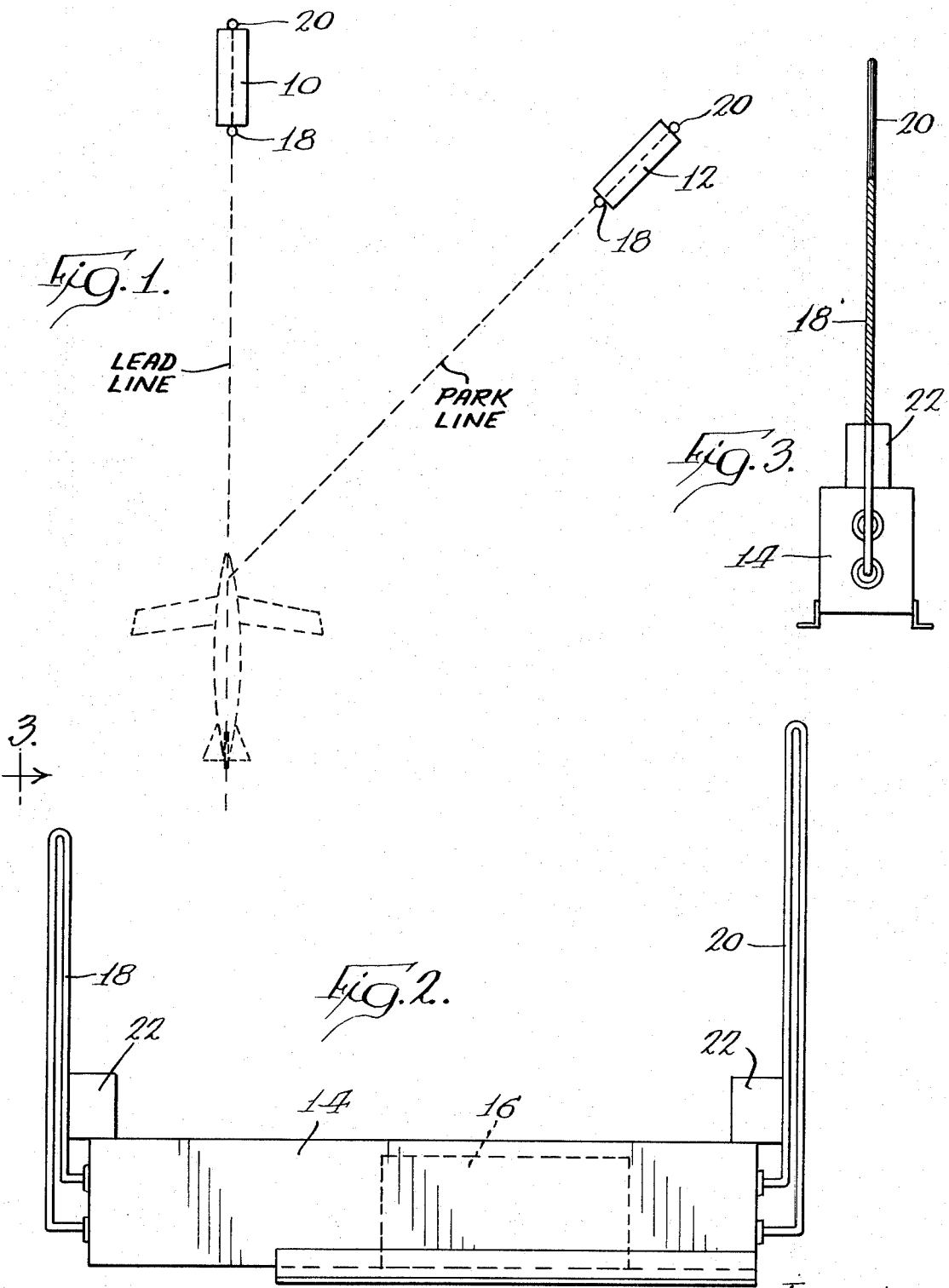

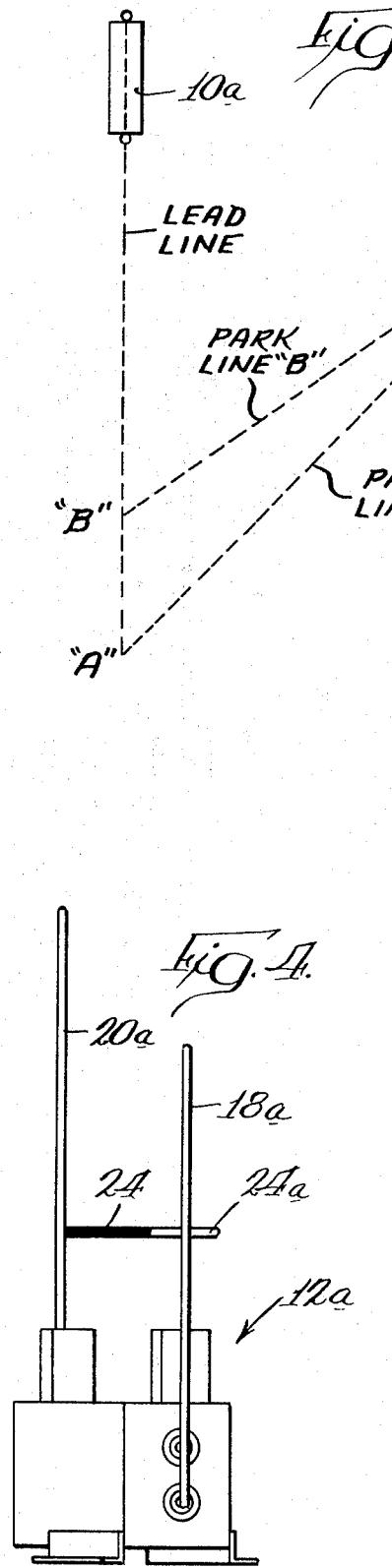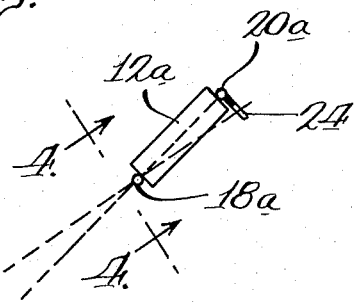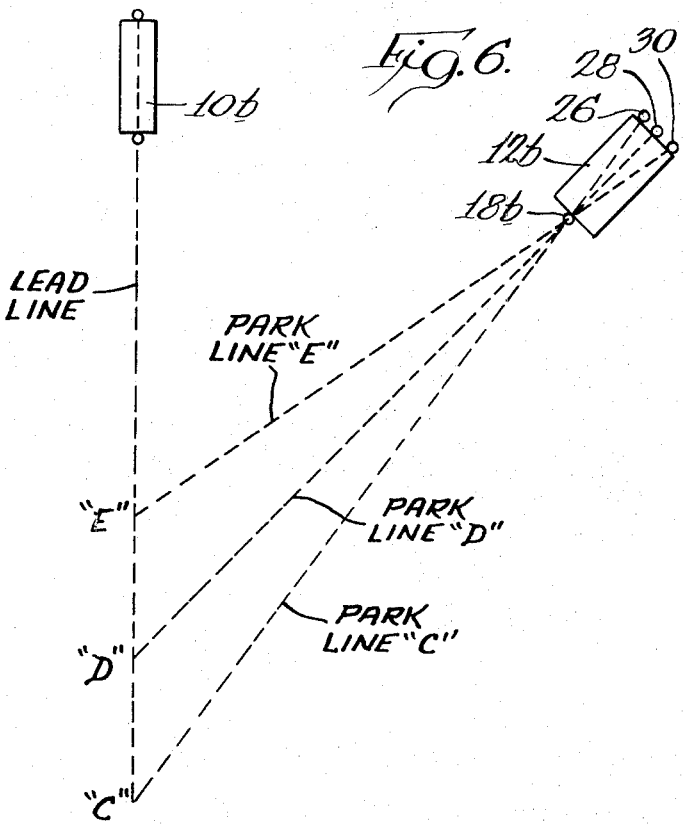

AIRCRAFT PARKING METHOD AND MEANS

BACKGROUND OF THE INVENTION

Heretofore, it has been conventional to have a ground crew man stand in the vicinity of an aircraft loading gate or ramp and to have him direct the pilot by hand signals in such manner that the pilot may bring the aircraft to a selected parking spot adjacent the gate. With modern jetway type passenger ramps, i.e., automated movable tunnels extending from the second story of the terminal building directly to the passenger door of the aircraft, it has been necessary to attain a fairly substantial degree of accuracy in spotting the aircraft for cooperation with the movable ramp.

Considering the problems of human error and the difficulties of communication in the circumstances, especially in inclement weather when hand signals may not be seen or properly interpreted, this system of guidance has become outmoded. Also, there has been substantial expense incurred in employing and training ground crew personnel for this work.

Consequently, airline companies have tried various automated systems of parking guidance. For example, one concern tried to employ mirrors on the terminal building in conjunction with spots painted on the pavement, but this did not afford the requisite accuracy, the spots would wear off and the same were usually not visible in inclement weather. Similarly, a variety of light systems have been tried, but have proven to be of insufficient accuracy and reliability.

SUMMARY OF THE INVENTION

This invention provides means defining a very finely delineated lead line clearly visible at a substantial distance from the terminal building on which the pilot can readily align the aircraft and taxi the craft toward the terminal, and second similar means defining a finely delineated and readily viewed park line designating a precise point at which the aircraft is to be stopped. The method is extremely simple to practice, with just a bare explanation, and its basic simplicity contributes to its reliability and accuracy.

In experimental testing with pilots who never practiced the method before, using jet aircraft of the Douglas DC8, Boeing 727 and Caravelle classes, the maximum deviation from absolute accuracy was 3 inches.

The means or apparatus of the invention is characterized particularly by use of brilliant neon tubes of small diameter, for example one-fourth inch, which provide a clear cut beacon even in fog, rain and snow, and afford a finely delineated line for the pilot to follow. Additionally, these tubes have an extremely long life, even in the environment of jet induced vibration, are substantially maintenance free, and afford absolute accuracy.

The invention further facilitates by simple modification of the park line unit a plurality of parking indicia to accommodate accurate spotting of various types or classes of aircraft in respective spots for proper correlation of the respective aircraft with the jetway ramp.

Other objects and advantages of the invention will become apparent in the following detailed description as taken in conjunction with the accompanying drawings; the description and drawings being given for purposes of acquainting those skilled in the art with the manner of making and using the invention, and with the best mode presently contemplated by me for carrying out my invention.

THE DRAWINGS

FIG. 1 is a plan view illustrating the basic apparatus and the mode or method of use thereof pursuant to the invention;

FIG. 2 is a side elevation of one of the two components of the apparatus of the invention, the same being usable for both the lead line unit and the park line unit of FIG. 1;

FIG. 3 is a front view of the unit of FIG. 2, the view being taken substantially on line 3—3 of FIG. 2;

FIG. 4 is a perspective frontal view of a modified form of park line unit, the view being taken substantially on line 4—4 of FIG. 5;

FIG. 5 is a plan view depicting the mode or method of use of the park line unit of FIG. 4; and FIG. 6 is a plan view similar to FIG. 5 depicting a further form of park line unit and its method of use.

DETAILED DESCRIPTION

Referring to FIGS. 1 and 3, the apparatus of the invention is comprised simply of two light units, namely a lead line unit 10 and a park line unit 12, which in the embodiment of FIG. 1 may be identical and of the structure shown in FIGS. 2 and 3.

The basic light unit (10 or 12) is comprised of a simple sheet metal base 14 adapted to house a conventional neon tube transformer 16 and the customary connections thereto of the neon tubes and a power supply cord (not shown). Projecting from the forward end of the base is a first neon tube 18 of inverted U-shape, the legs of which are aligned with one another on the center line of the base. In similar manner, a second neon tube 20 projects from the rear end of the base. Preferably, plastic blocks 22 are secured to the base and engaged with each of the tubes to locate or position the same relative to the base and to aid in supporting the same.

In the preferred embodiment of the light unit, the two neon tubes 18 and 20 extend vertically upward from the base 14 in alignment with the longitudinal center line of the base; the two tubes are different colors; and the front tube 18 is shorter than the rear tube 20. Specifically, I prefer to utilize at the front a green neon tube approximately 12 inches in height, at the rear a red neon tube approximately 18 inches in height, and to space the tubes approximately 36 inches apart. Each of the tubes is preferably a brilliant neon tube approximately one-fourth inch in diameter. By virtue of this assembly, when the two tubes are viewed in visual alignment from the front, as shown in FIG. 3, they will appear as a very bright but fine vertical line of light comprised of a lower green segment and an upper red segment affording a clear indication of the facts that both tubes are operative and are exactly aligned.

In the final assembly, inasmuch as the lights are intended for outdoor installation, each unit is preferably enclosed in a weather resistant housing (not shown) having a transparent front wall accommodating a frontal view of the neon tubes (as shown in FIG. 3) and a view thereof from slight angles to both sides of the frontal view.

In use, the lead line unit 10 is mounted substantially horizontally on the terminal building or other appropriate facility adjacent the loading gate or ramp in such position that the tubes 18 and 20 thereof are disposed on an imaginary line of sight (herein called the lead line) which extends along a clear avenue of aircraft approach to the terminal and which would intersect the pilot's seat when an aircraft is parked in a selected parking spot near the ramp. The park line unit 12 is mounted similarly, except that its tubes 18 and 20 are disposed to fall on an imaginary line of sight (herein called the park line) which is angularly related to the lead line and which would also intersect the pilot's seat (and thus the lead line) when the aircraft is parked in said selected parking spot.

While the angle of intersection of the imaginary park and lead lines is not absolutely critical, I prefer that the angle be in the range of from about 30° to about 45° as this results in a particular convenience for the pilot, extreme accuracy of parking, and several additional advantages which will be pointed out hereinafter.

In practice of the method of the invention, the pilot taxis his aircraft toward the terminal and the gate or ramp to which the aircraft has been assigned. Preferably, the lead line unit 10 is constructed and mounted so that the pilot will see the light therefrom through a relatively limited arc in the vicinity of the particular gate or ramp so as to avoid confusion with like units at or adjacent other ramps, but nevertheless a sufficiently wide arc to facilitate ready recognition and sufficient advance notice to accommodate turning and alignment of the aircraft with the light. The park line unit is preferably mounted in such a position that the pilot does not see the light therefrom until he has commenced his approach along the lead line. In the environment of FIG. 1, this assumes that the aircraft will approach the gate from the right side of the sheet.

As the pilot taxis from right to left, he will first observe the green stripe or line of light emanating from the front light 18 on the lead line unit 10; shortly thereafter the red stripe or line of light from the rear light 20 of the unit 10 will appear to the right of the green light; and then the two stripes of light will appear to move relatively toward one another. As the red stripe of light approaches the green, the pilot turns the aircraft toward the gate and steers the aircraft so that the two stripes coincide, i.e., so that there appears to be but one stripe of light which is of green color in its lower regions and of red color in its upper regions. The aircraft will now be on the lead line moving toward the gate or terminal, and the pilot can readily maintain the craft on this line by maintaining visual alignment of the lights 18 and 20 in the unit 10.

The next thing the pilot will see off to his right is the green stripe of light from the front tube 18 of the park line unit 12; shortly thereafter the red stripe of light from the rear tube 20 of this unit will appear to the right of the green stripe; and then the two stripes will appear to move toward one another. When the two stripes of light from the unit 12 become coincident, the pilot simply stops the plane, whereupon the plane is parked precisely on the preselected spot.

As previously noted, in experimental testing with commercial pilots operating commercial jet aircraft, the maximum deviation from absolute accuracy was 3 inches, i.e., the nose wheel of the aircraft was no further than 3 inches from its intended spotted position.

This degree of accuracy is due in large measure to the use of small diameter neon tubes. With large tubes or tubes having significantly less light definition, errors and misjudgment are inherent and accuracy is sacrificed. The use of brilliant neon tubes affords the advantages of clear visibility at substantial distances and in inclement weather, and aids in maintaining a high degree of light definition for purposes of accuracy. Even from 200 feet away, the light is bright and has excellent definition, whereby lead line error is practically nil.

The disposition of the park line unit 12 at an angle of 30° to 45° to the lead line unit 10 affords the advantages that it provides an adequate angle for precise definition of the parking spot; it causes the park line unit to be out of the pilot's vision during initial alignment of the plane on the lead line unit, thereby to avoid confusion; it provides the pilot with advance warning of his approach to the parking spot by giving him an arc or area of movement through which he can see first the green light and then both lights; and finally, it is an angle that is convenient to the pilot considering his area of view. A lesser angle has a tendency to reduce the degree of precision or accuracy attainable and can result in confusion; and a greater angle reduces the advance warning time afforded the pilot and therefore mitigates against precise or accurate stopping of the plane.

While both the apparatus and the method are extremely simple, the results thereof have been substantial.

Many commercial airlines today are operating two or more basic classes or types of aircraft, yet they normally desire that each gate or ramp be able to handle all classes and types in the service of the particular company and that the jetway ramps be conveniently usable with all classes and types. Because of differences in size, style, passenger door location and/or pilot's seat location, this requires two or more parking spots in order to locate the planes properly in relation to the gate or ramp. The present invention solves this problem conveniently and practically, and with the same accuracy and reliability as above described.

Referring to FIGS. 4 and 5, I have shown a park line unit 12a adapted to provide for definition of two different parking spots, using only one lead line unit 10a and one park line unit 12a. The lead line unit 10a is the same as the unit 10 previously described. The park line unit 12a is different solely to the extent that a horizontal leg 24 is bent into the rear red tube 20a thereof. This leg is suitably about 8 inches long with the inner 6 inches thereof blocked off. Thus, as viewed in front elevation, the viewer would see an 18 inch tall vertical red stripe or line and spaced to one side thereof a 2 inch horizontal red stripe or line 24a. The horizontal leg 24 may extend either to the right or the left of the vertical leg of the tube 20a as desired or required for various types of aircraft and/or location of the park line unit to the right or left of the lead line unit.

In use, the pilot maneuvers the craft precisely as previously described. If the craft is of Class "A" for example, the pilot will stop the plane as he did before with the vertical green stripe of the front light 18a aligned with the vertical red stripe of the rear light 20a of the park line unit 12a, whereupon the craft will be parked at spot "A" of FIG. 5. On the other hand, if the craft is of class "B" for example, the pilot will continue past spot "A" and let the green stripe of light in unit 12a shift relatively to the right of the vertical red stripe until the vertical green stripe bisects the two inch long horizontal red stripe 24a, whereupon the pilot stops the craft and it comes to rest precisely on parking spot "B" of FIG. 5. Because of the relative distances involved, even a short leg 24 accommodates substantial differentiation between parking spots "A" and "B."

Another way of achieving the same result and of providing an even larger number of alternate parking spots is depicted in FIG. 6 wherein the apparatus comprises a lead line unit 10b the same as the unit 10 previously described and a park line unit 12b having one front neon tube 18b and a plurality of laterally spaced rear neon tubes 26, 28 and 30. These rear tubes could be separate vertical spurs on a single rear tube, but it would be preferable to provide separate tubes of different colors, for example, red, yellow and white, in order to minimize confusion. By selectively aligning the green stripe of light with the red, yellow or the white, the pilot could selectively stop the aircraft in any of parking spots "C," "D" and "E" as depicted in FIG. 6.

While I would prefer simplicity to the greatest degree attainable, it will be apparent of course that multiple rear spurs or lights could be embodied in the lead line unit 10 as well as the park line unit 12, and that multiple front spurs of lights could be embodied in either or both of the units to obtain almost any combination of parking locations desired.

Accordingly, while I have shown and described what I regard to be the preferred embodiments of my invention, it is to be appreciated that various changes, rearrangements and modifications may be made therein without departing from the scope of the invention as defined in the appended claims.

I claim:

1. Means for facilitating the parking of aircraft comprising a first visual guidance unit having a pair of spaced apart neon tubes therein adapted to be aligned visually for delineating a lead line for the pilot of the craft to follow, and a second visual guidance unit *spaced from and disposed at an angle to said first unit and* having a pair of spaced apart neon tubes therein adapted to be aligned visually for delineating a park line angularly related to and intersecting said lead line at the point at which the pilot is seated when the aircraft is to be stopped in a preselected parking position, the tubes of each said pair being of different colors and the one remote from the air-craft having a portion that remains visible when the pair of tubes are visually aligned.

2. The means of claim 1 wherein the tubes of both units are brilliant neon tubes of small diameter.

3. The means of claim 1 wherein the tubes of both units are disposed vertically.

4. The means of claim 1 wherein the tubes of each unit are disposed vertically and the one remote from the aircraft is taller.

5. The means of claim 1 wherein at least one of said units includes neon tube means defining a plurality of pairs of selectively alignable indicia for delineating lead and park lines intersecting at a plurality of points and defining a plurality of preselected parking positions.

6. The means of claim 5 wherein said second unit includes a vertical front neon tube and a back neon tube having a vertical leg and a horizontal leg, said front tube being visually alignable selectively with the vertical and horizontal legs of said back tube for delineating a pair of park lines angularly intersecting said lead line at different points therealong.

7. The means of claim 5 wherein said second unit includes a vertical front neon tube and laterally spaced plural rear vertical tube means with which said front tube is adapted to be selectively aligned visually for delineating a plurality of park lines angularly intersecting said lead line at different points therealong.

8. The means of claim 7, wherein said front tube is of a first color, said rear tube means are of colors different from one another and said front tube, and said rear tube means are taller than said front tube.

9. The means of claim 1 wherein the angle of intersection of said lead line and said park line falls within the range of from about 30° to about 45°.

10. A method for parking aircraft comprising the steps of positioning a first spaced apart pair of neon tubes in such location that the same upon visual alignment thereof define a lead line extending along an avenue of aircraft taxi approach and intersecting a preselected parking spot in said avenue, positioning a second spaced apart pair of neon tubes in such location that the same upon visual alignment thereof define a park line extending in angular relation to said lead line and intersecting the same at said spot, taxiing an aircraft into position where said first pair of tubes are visually aligned and taxiing the aircraft along said line toward said first pair of tubes by maintaining the same in visual alignment, observing said second pair of tubes, and stopping the aircraft when said second pair of tubes are visually aligned.

11. The method of claim 10 including the steps of positioning third tube means in such location relative to the tubes of said second pair that one of the latter upon visual alignment with said third tube means defines a second park line angularly related to both the first park line and the lead line and intersecting the lead line at a second spot, and selectively stopping the aircraft along said lead line at either of said park lines.

12. The method of claim 10, including the steps of positioning additional tube means in such locations relative to the tubes of said second pair that one of the latter upon visual alignment with respectives ones of said additional tube means defines additional park lines angularly related to the first park line and one another and intersecting the lead line at different respective spots, and selectively stopping the aircraft along said lead line at any of said park lines.

13. The method of claim 10, including the step of positioning said second pair of tubes in such location that they are not visible from the aircraft until after the aircraft has been aligned with and is advancing along the lead line.

14. The method of claim 10 including the step of positioning said pairs of tubes in such locations that the angle of intersection of said lead and park lines is of the order of at least about 30°.

15. The method of claim 10, including the step of positioning said pairs of tubes in such locations that the angle of intersection of said lead and park lines falls within the range of from about 30° to about 45°.

* * * * *

UNITED STATES PATENT OFFICE
CERTIFICATE OF CORRECTION

Patent No. 3,674,226     Dated July 4, 1972

Inventor(s) Richard Z. Wasson

It is certified that error appears in the above-identified patent and that said Letters Patent are hereby corrected as shown below:

On the cover sheet [73] "Federal Sign and Signal Corporation, Chicago, Ill.", should read -- Aircoa Corporation, Homewood, Ill., a corp. of Ill. -- .

Signed and sealed this 19th day of December 1972.

(SEAL)
Attest:

EDWARD M. FLETCHER, JR.          ROBERT GOTTSCHALK
Attesting Officer                Commissioner of Patents